Nov. 2, 1965      J. D. STEPHENS ETAL      3,215,415
GAS-LIQUID CONTACT APPARATUS
Original Filed April 13, 1955
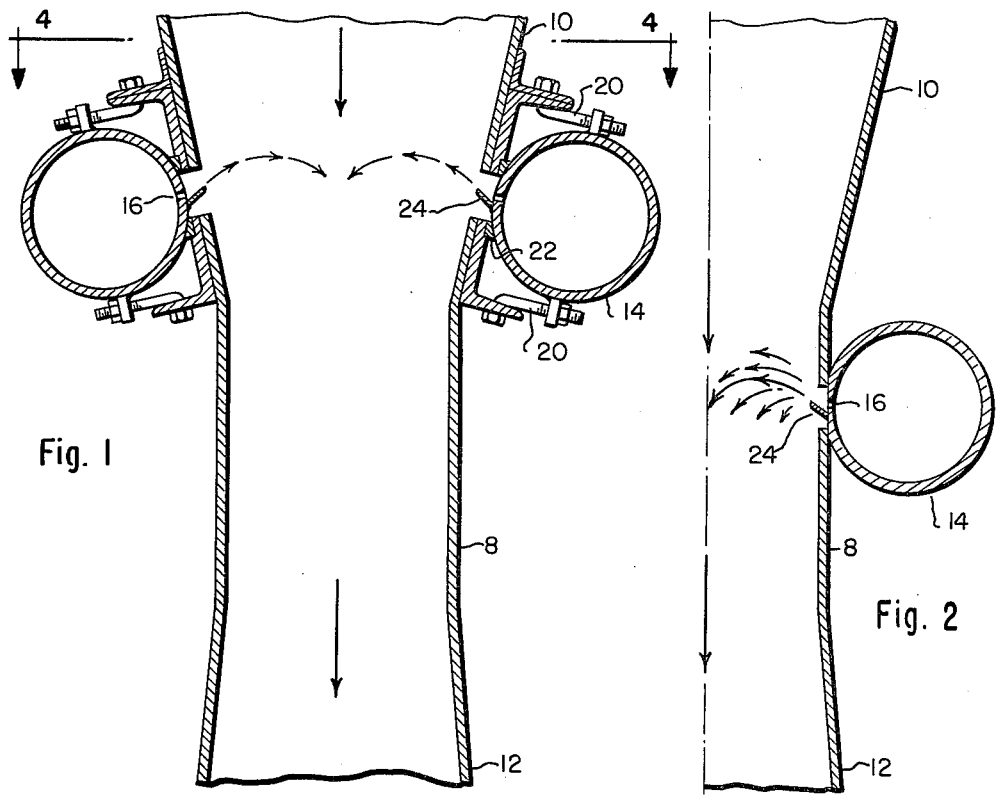
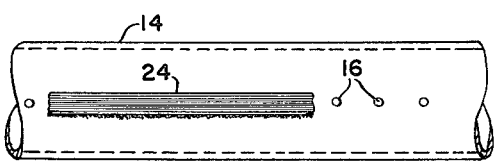
Fig. 4      Fig. 3
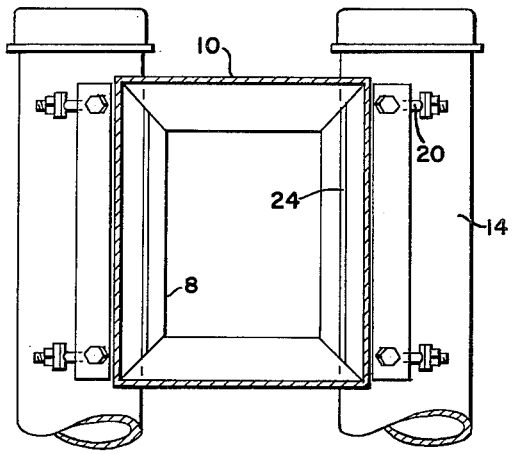
INVENTORS
JAMES D. STEPHENS
ALFRED W. ANTHONY, J!
JOHN A. DANKO
BY Kenway, Jenney, Witte
     + Hildreth
ATTORNEYS United States Patent Office
3,215,415
Patented Nov. 2, 1965

3,215,415
GAS-LIQUID CONTACT APPARATUS
James D. Stephens, Wadsworth, Ohio, Alfred W. Anthony, Jr., Newtonville, Mass., and John A. Danko, Barberton, Ohio, assignors, by mesne assignments, to Chemical Construction Corporation, a corporation of Delaware
Continuation of application Ser. No. 501,034, Apr. 13, 1955. This application Oct. 19, 1960, Ser. No. 63,694
2 Claims. (Cl. 261—118)

This application is a continuation of U.S. patent application Serial No. 501,034 filed April 13, 1955, now abandoned.

The present invention relates to gas-liquid contact apparatus, and is concerned more particularly with apparatus for effecting intimate contact between relatively viscous liquids and a moving stream of gases, for such purposes as heat transfer, absorption, desorption, and removal of finely divided particles that may be suspended in the gases.

In U.S. Letters Patent No. 2,604,185 issued July 22, 1952, one of the patentees of which is a co-inventor of the present invention, there is shown apparatus by which washing liquid is directed into a high velocity gas stream in such a way as to promote extensive gas/liquid contact, as well as achieving effective removal of finely divided particles suspended in the gases. According to that patent, the stream of gases to be washed or scrubbed is directed through a passage having means, such as a converging section, for accelerating the gases to a high velocity while streams or jets of treating liquid are introduced into the gas stream at or closely adjacent the region of maximum gas velocity, with the result that the gases and suspended matter are caused to impinge on the jets of liquid. The effect of this high velocity impingement is to bring about intimate scrubbing contact that effectively entrains the particles within the liquid while the jets are being broken up into finely divided droplets under the action of the high velocity gas. If the entering gases are at a temperature substantially above that of the liquid, effective cooling of the gases occurs, with evaporation of liquid.

In carrying out the teachings of Patent No. 2,604,185, it has generally been the practice to introduce the liquid through apertures or orifices that discharge a solid stream or jet of liquid. The spacing of the jets, their diameter, the liquid pressure and the rate of the gas flow are correlated to achieve effective distribution of liquid within the zone of high velocity gas flow, so as not to leave regions through which the gas may pass without adequate gas-liquid contact. When water or other liquids of low viscosity have been employed as the contacting medium, relatively uniform distribution and consequent excellent scrubbing efficiencies have been attainable with the use of spaced jets of liquid discharging directly into the gas stream. When attempts have been made to utilize relatively viscous liquids as the contacting medium, however, collection efficiencies have been maintained only by the use of higher liquid/gas ratios, with resulting greater pressure drop in the gas stream, because of the less effective atomization of the viscous liquid by the gas stream and consequent reduction in gas/liquid contact surface. A problem of maintaining high collection efficiencies occurs in installations where it is desired to use a viscous washing liquid, as distinguished from the use of water in a single or multiple pass. An example of the use of a viscous washing medium (compared to water) is encountered in apparatus of the type of Patent No. 2,604,185 when employed for the collection of chemical fume and dust from the boiler flue gases from the so-called kraft recovery boiler in paper mills, by recirculating pulp residual liquor as the washing medium while simultaneously effecting evaporation of water from the recirculated liquor as a result of contact of the liquor with the hot gases. In such operations it has been found effective and economically attractive not only to reduce the quantity of fine particles present in the stack discharge, but also to collect such particles in the residual pulping liquor being returned to the combustion chamber of the boilers for burning. The final partial evaporation of the washing liquid through contact with the hot waste gases enhances the thermal efficiency of the overall process. In such procedure, it is obviously desirable to allow the concentration of solids in the washing solution to build up to a high value, consistent with efficient dust and fume collection, so as to minimize the amount of water to be evaporated from the liquor in the combustion chamber.

When such viscous liquid, commonly termed black liquor in the paper mill art, is introduced into the throat region of the treating passage of apparatus of the type of Patent No. 2,604,185, it is found that the coverage is by no means as uniform as when liquids of a low viscosity, such as water, are employed as the washing medium. While the jets of a viscous liquid are disrupted and atomized by the high velocity impinging gas stream, this effect occurs to a markedly less extent than with a less viscous liquid, such as water, with the result that the collection efficiency, for a given pressure drop across the venturi passage, using straight streams or jets, is below that obtainable with water. On the other hand, it remains essential to utilize plain orifices or apertures for the liquid discharge, so as to avoid the clogging problems that would be a serious drawback if it were attempted to use atomizing nozzles or spray jets for the viscous black liquor of high solids content.

In order to make available the advantages of the method and apparatus of Patent No. 2,604,185 for installations wherein it is advantageous to employ a viscous liquid as the washing medium, the present invention has as an object the provision of simple but effective means by which the liquid distribution within the treating passage may be materially improved.

More specifically, it is an object of the invention to provide liquid distributing means, effective with relatively viscous liquids, which nevertheless permits the use of flow passages of sufficient size to minimize difficulties from clogging.

In accordance with these and other objects, a feature of the invention consists in liquid supplying and distributing means for gas treating apparatus, whereby a plurality of discrete jets of treating liquid are caused to impinge on surfaces which serves to spread the treating liquid across the passage so as to achieve, with reasonable quantities of washing liquid, efficiencies of thermal exchange and of particle collection and removal from the gas stream that are comparable to those obtained when water or washing liquids of low viscosity are employed.

In the drawings illustrating the invention,

FIG. 1 is a sectional elevation of a portion of a vertically arranged venturi-type gas treating passage, showing the liquid introducing means of the present invention arranged to introduce the liquid in a region slightly upstream from the venturi throat itself.

FIG. 2 is a partial sectional elevation corresponding to the right-hand portion of FIG. 1, but showing an alternative arrangement of liquid introducing means in relation to the walls of the passage, the liquid being introduced into the throat of the venturi.

FIG. 3 is a detail front elevation, partly broken away, showing a portion of the header or manifold constituting the liquid distributing means employed in carrying out the invention.

FIGURE 4 is a plan view showing a portion of the headers and sprays as seen in the direction 4—4 of FIGURE 1.

In FIG. 1 of the drawings, there is illustrated at 8 the throat portion of venturi type scrubbing apparatus of the general nature of that shown in Patent No. 2,604,185. The gases to be treated are passed downwardly through the throat section at high velocity from the converging section 10 upstream of the throat. Only a portion of the converging section is shown, and it will be understood that the gases are supplied to the venturi passage by a suitable conduit connected to the boiler or other apparatus, the gases from which are to be cleaned or otherwise treated by a washing liquid. The conduit may be arranged in a horizontal or vertical position, or any intermediate position. A vertical arrangement however will insure a longer period of contact between the gas and liquid particles.

Downstream from the venturi throat 8 is the expansion section 12 having gradually diverging walls for effecting gas deceleration. Following the expansion section there will generally be employed some form of separator, such as a cyclonic separator of the type of Pease Patent No. 1,992,762.

While the throat and adjacent sections may be of circular cross-section, it is generally advantageous from the standpoint of fabrication to make the passages of rectangular cross-section. The use of a rectangular throat likewise aids in achieving effective liquid distribution over the throat cross-section for throats of substantial area, as it is possible to arrange for the liquid introduction along opposite walls of the major transverse axis, so that the liquid is projected across the short dimension of the throat.

As has previously been indicated, the use of viscous liquid as the washing medium increases the difficulty in obtaining effective distribution of the liquid over the throat cross-section without the use of excessive liquid quantities. If the liquid is introduced in the form of discrete jets represented, for example, by the discharge from apertures of the order of ¼ inch in diameter, spaced approximately two inches apart, as is successfully employed with water and like liquids, it is found that with black liquor and other viscous liquids the throat coverage is relatively poor, with consequent lowering of the efficiency of washing. On the other hand, if the jets are spaced closer together and the diameter reduced to maintain approximately the same rate of liquid introduction, then the jets become so small as to be impractical from the standpoint of maintaining the orifices free from clogging. Narrow slots, utilized in an attempt to obtain more extensive liquid distribution, have been found to be particularly subject to clogging and require special cleaning means if they are to be maintained in proper operation.

As shown in FIG. 1, the region of liquid introduction is preferably adjacent the upstream end of the venturi throat of the treating passage. For purposes of illustration, in this figure the liquid is introduced into the converging section a short distance upstream from the throat, as may be desirable when relatively hot gases are to be treated. To introduce the washing liquid from the walls of the passage, headers or manifolds 14 are employed which may be conveniently made in the form of pipes connected to a suitable supply of washing liquid under pressure (not shown). These manifolds or headers are provided with a row of orifices 16, which may be simply holes drilled radially through the wall of the pipe. By way of example, these orifices may be of the order of ¼ inch in diameter and spaced two to three inches apart throughout the length of the header.

To admit the jets of washing liquid to the treating passage of the venturi, the walls of the conduit are provided with slots of sufficient width to clear the jets in their discharge from the orifices 16 of the headers. The headers may be removably secured to the outside of the passage walls by means of bolts 20 which, when tightened, cause the header to seat in sealing relation against a gasket 22 interposed between the header and the outside of the passage in the vicinity of the slot.

In order that these spaced jets of washing liquid may be rendered effective for purposes of intimate gas-liquid contact in the region of the continuing high velocity gas flow downstream from the region of liquid introduction, means are provided on which the jets may forcibly impinge. Such means comprises plates 24 secured to the manifolds at an angle which places the plates obliquely in the path of the jets as they emerge from the orifices. These plates may be of strips of rigid metal, secured as by welding to the manifolds, and preferably disposed at an angle of approximately 30° to a pipe radius at the orifices. As shown in FIG. 1, these plates are inclined in an upstream direction so that the general course of the fluid flow is slightly upstream, the approximate paths being represented by the arrows. Under the influence of the high velocity gases, the general path of the liquid sprays is turned in the direction of gas flow as the liquid traverses the passage.

As a result of these obliquely mounted plates disposed directly in the line of discharge of the jets, the relatively viscous black liquor supplied to the headers at a pressure in the range 10–50 lbs. per square inch is caused to fan out upon impact with an intermediate portion of the plates so as to spread the discharge transversely of the high velocity gas stream within the passage. This fanning out or spreading of the discharge of the individual jets is sufficient to cause the sheet-like sprays from adjacent jets substantially to overlap, so that the coverage is relatively uniform across the entire throat cross-section. As a result, the on-rushing high velocity stream of gases with suspended matter is caused to impinge on the masses of washing liquid. The initial impingement occurs at a relative velocity substantially that of the gas stream within the throat which, in the usual operation is in excess of 200 feet per second. Under the influence of the gas stream, the sheets of liquid are broken up into finely divided droplets as the result of the energy involve in accelerating the liquid. During this brief interval, intensely turbulent conditions prevail within the throat, enhancing the opportunity for gas-liquid contact with effective heat transfer from the hot gases to the liquid and consequent evaporation, coupled with highly efficient particle collection by the liquid.

In the embodiment illustrated in FIG. 1, the headers or manifolds are supported in such relation to the passage walls that the plates 24 do not project appreciably into the gas stream. Such positioning results from the gaskets 22, plus the thickness of the margins of the angle members 30 which form a part of the supporting and clamping means for the headers. If desired, the deflecting plates 24 may be allowed to project slightly into the gas stream, as shown in FIG. 2. In this view, the headers are mounted directly on the walls of the conduit, although suitable gasket means may be provided if desired for sealing the joint between conduit and header. As a further alternative to FIG. 1, and by way of illustration, the headers are mounted to effect discharge of the washing liquid into the throat portion of the venturi adjacent the upstream end, as may be preferred in certain instances. Clamping means as shown in FIG. 1, or other suitable securing arrangements may be employed to hold the manifolds snugly against the conduit with the plate 24 extending into the slot and projecting slightly into the passage itself. By reason of the flushing action provided by the liquid jets in their impingement on the plates, build up of solid matter on the plates is prevented in spite of their projection into the gas stream. It is nevertheless desirable that the plates project only a small distance, if at all, in order not to introduce abrupt flow discontinuities that unduly increase the pressure drop without commensurate increase in scrubbing efficiency. In general it is preferred that substantially all the pressure drop that takes place between inlet and outlet of the venturi-shaped portion of the scrubber be utilized to break up and accelerate the washing liquid that is distributed over the stream cross-section with no appreciable initial component of downstream velocity.

By employing, for the introduction of the relatively viscous washing liquid such as black liquor, apertures or orifices of the order of ¼ inch in diameter, comparable to those employed with water, difficulties due to clogging are minimized as compared with the situation if atomizing nozzles or sprays were attempted to be employed. Through the use of the obliquely inclined splash plates or baffles, these solid jets of viscous liquid are caused to fan out into sheets having substantial covering power so as to distribute the liquid across the passage, within or slightly upstream from the throat itself, beginning in the region close to the walls of the passage, even though the individual orifices are fairly widely spaced compared to the orifice diameter. These flat sheets, though their course be turned downstream under the accelerating action of the gas stream, nevertheless may be given sufficient initial momentum to carry effectively to the mid-point of the passage to complement the discharge from the opposite wall, thereby achieving relatively good distribution of the liquid for effective thermal transfer and evaporation, as well as interception of the particles suspended in the gas stream.

In the case of the treatment of boiler flue gas from kraft recovery boilers, it has been established that collection efficiencies in excess of eighty-five percent may be attained when the liquid distributing means of the present invention are employed in the venturi scrubbing apparatus. Furthermore, the thermal efficiency of the overall process is appreciably enhanced, through evaporation of excess water from the black liquor by contact with the hot gases. The effectiveness of the gas/liquid contact, in spite of the high viscosity of the liquid, is indicated by typical figures, attained in operation, of approximately a seven percent increase in available heat from the burning of the black liquor, coupled with a reduction in gas temperature from approximately 485° to 180°.

While the invention has been described, for purposes of illustration, with reference to the use of black liquor as the viscous gas-contacting liquid, it is to be understood that the invention is not so limited, but comprehends the effective employment of various types of liquids, such as acids, slurries and other viscous media, for particle collection, thermal exchange, absorption, desorption and the like in venturi-type gas/liquid contact apparatus. Furthermore, the invention is not necessarily limited to the particular form of apparatus shown and described, but comprehends other forms and constructions within the scope of the appended claims.

We claim as our invention:

1. Apparatus for promoting intimate gas-liquid contact between a high velocity gas stream and a relatively viscous liquid comprising a treating passage having walls defining a converging section, a throat section, and a diverging section, the throat section and at least an adjacent portion of the converging section having a generally rectangular configuration in cross-section in which one transverse dimension is greater than the other transverse dimension, the means for introducing the liquid into the treating passage in the vicinity of the upstream end of the throat section, said means comprising a pair of headers to which liquid is supplied under pressure, each header having a row of spaced orifices for the discharge of jets of liquid, apertures in the walls having the greater dimension, means for securing the headers outside of the walls of the passage and along the walls defining the greater transverse dimension of the passage with the orifices in position to discharge the liquid through the apertures in the walls into the passage, said header securing comprising elongated generally channel-shaped brackets fixed to said passage walls with the bases of said brackets supporting said headers in positions spaced from said passage walls and having openings coinciding with the apertures in said passage walls, the legs of said channel-shaped brackets extending outwardly on opposite sides of said headers, connecting elements attaching said headers to said legs and sealing means around said orifices between said headers and brackets, and baffle plates secured to and extending along the headers adjacent the row of orifices, the baffle plates each being mounted at an oblique angle to and intersecting the direction of jet discharge from the orifices to cause the jets to impinge on and be distributed as sheet-like sprays across the treating passage in the direction of the shorter transverse dimension thereof, said baffle plate extending into the openings in the bases of said brackets to positions closely adjacent to but not materially past said passage walls.

2. The apparatus as recited in claim 1 wherein the centerlines through the converging section, the throat section and the diverging section are substantially common.

References Cited by the Examiner

UNITED STATES PATENTS

| 487,279 | 12/92 | Lane. |
|---|---|---|
| 2,828,951 | 4/58 | De La Fourniere _____ 261—118 |

FOREIGN PATENTS

| 1,046,238 | 7/53 | France. |
|---|---|---|
| 142,445 | 7/20 | Great Britain. |

HARRY B. THORNTON, *Primary Examiner.*

HERBERT L. MARTIN, *Examiner.*

UNITED STATES PATENT OFFICE
CERTIFICATE OF CORRECTION

Patent No. 3,215,415November 2, 1965

James D. Stephens et al.

It is hereby certified that error appears in the above numbered patent requiring correction and that the said Letters Patent should read as corrected below.

In the grant, lines 3 to 5, for "assignors, by mesne assignments, to Chemical Construction Corporation, a corporation of Delaware," read -- said Anthony, assignor, by mesne assignments, to Chemical Construction Corporation, a corporation of Delaware; said Stephens and said Danko, assignors to The Babcock & Wilcox Company, of New York, N. Y., a corporation of New York, --; line 14, for "Chemical Construction Corporation, its successors" read -- Chemical Construction Corporation and The Babcock & Wilcox Company, their successors --; in the heading to the printed specification, lines 5 and 6, for "assignors, by mesne assignments, to Chemical Construction Corporation, a corporation of Delaware" read -- said Anthony, assignor, by mesne assignments, to Chemical Construction Corporation, a corporation of Delaware; said Stephens and said Danko, assignor to The Babcock & Wilcox Company, New York, N. Y., a corporation of New York --.

Signed and sealed this 27th day of December 1966.

(SEAL)
Attest:

ERNEST W. SWIDER
Attesting Officer

EDWARD J. BRENNER
Commissioner of Patents